United States Patent
Mallebay-Vacqueur et al.

(10) Patent No.: US 7,240,544 B2
(45) Date of Patent: Jul. 10, 2007

(54) AERODYNAMIC NOISE SOURCE MEASUREMENT SYSTEM FOR A MOTOR VEHICLE

(75) Inventors: Jean P Mallebay-Vacqueur, Bloomfield Hills, MI (US); Mitchell Puskarz, Troy, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 28 days.

(21) Appl. No.: 11/020,786

(22) Filed: Dec. 22, 2004

(65) Prior Publication Data

US 2006/0137439 A1    Jun. 29, 2006

(51) Int. Cl.
*G01M 9/00* (2006.01)
(52) U.S. Cl. ........................................................ 73/147
(58) Field of Classification Search .................. 73/603, 73/583, 147, 170.01
See application file for complete search history.

(56) References Cited

U.S. PATENT DOCUMENTS 5,585,557 A * 12/1996 Loschke et al. ......... 73/170.14
6,351,989 B1 * 3/2002 Foss .......................... 73/118.1
6,550,332 B2 * 4/2003 Lee ............................. 73/583
7,036,361 B2 * 5/2006 Ochwat et al. ................ 73/147

OTHER PUBLICATIONS

Pininfarina Website  www.pininfarina.it/arc/english/home-newsarch.shtml.*
Lecture Note, Spatial transformation of sound fields, Bruel & Kjaer (English BA 7210-13) (undated).
Noise Source Detection with Sound Reflection, Structural Vibration and Acoustics, The American Society of Mechanical Engineers, DE-vol. 18-3, pp. 313-319, Sep. 17-21, 1989, T. Hayashi, et al.
Application Note, Measurement of Aerodynamic Noise using STSF, Bruel & Kjaer, M. Nakamura, et al. (undated).

* cited by examiner

Primary Examiner—Max Noori
(74) Attorney, Agent, or Firm—Ralph E. Smith

(57) ABSTRACT

An aerodynamic noise measurement system for a vehicle uses sound reflectors to determine the sound wave propagation of aerodynamic noise of the vehicle. The vehicle is placed within a test section of a wind tunnel. The air flow of the wind tunnel generates the aerodynamic noise as it passes over the vehicle. An array of sound reflectors is placed outside of the air flow of the wind tunnel. Microphone arrays receive the aerodynamic noise directly from the source and from the sound reflectors. An analyzer system forms an acoustic image of the vehicle based on the aerodynamic noise. A viewing device displays an image of the vehicle with an overlay of aerodynamic noise data in real-time.

18 Claims, 3 Drawing Sheets

AERODYNAMIC NOISE SOURCE MEASUREMENT SYSTEM FOR A MOTOR VEHICLE

FIELD OF THE INVENTION

The present invention relates to measurement of aerodynamic noise of a vehicle, and more particularly to measurement of aerodynamic noise of a vehicle using an array of acoustic mirrors.

BACKGROUND OF THE INVENTION

Engine noise, road noise, and aerodynamic noise are the primary sources of noise caused by a vehicle. As current efforts continue to decrease the engine and road noise, the relative contribution to noise from aerodynamic noise is increasing. Therefore, the aerodynamic noise must be reduced in order to reduce the overall amount of noise experienced in the vehicle or outside of the vehicle.

In order to determine the causes of aerodynamic noise from the vehicle, the aerodynamic noise from various point sources on the vehicle must be measured. A conventional method for measuring the aerodynamic noise uses an array of microphones stationed inside or outside the airstream at a fixed distance from the vehicle. However, limits on microphone size and geometry, as well as processing time, limit the effectiveness of this method. The microphone array also generates its own noise, which interferes with the measurement of the aerodynamic noise.

SUMMARY OF THE INVENTION

An aerodynamic noise measurement system for a vehicle comprises a wind tunnel that generates a flow of air. A test area is located within the flow of air. A plurality of sound reflectors are arranged outside of the flow of air. Each of the sound reflectors includes a microphone array that receives aerodynamic noise that is generated by a vehicle in the test area. The microphone array generates data signals indicative of the aerodynamic noise. An analyzer system receives the data signals and generates an acoustic image of the vehicle based on the data signals.

In another embodiment of the invention, an aerodynamic noise measurement method comprises generating a flow of air. A vehicle is located within the flow of air. Aerodynamic noise from the vehicle is measured at a plurality of sound reflectors arranged outside the flow of air. Data signals that are indicative of the aerodynamic noise are generated. One of a noise map and an acoustic image of the vehicle is generated based on the data signals.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
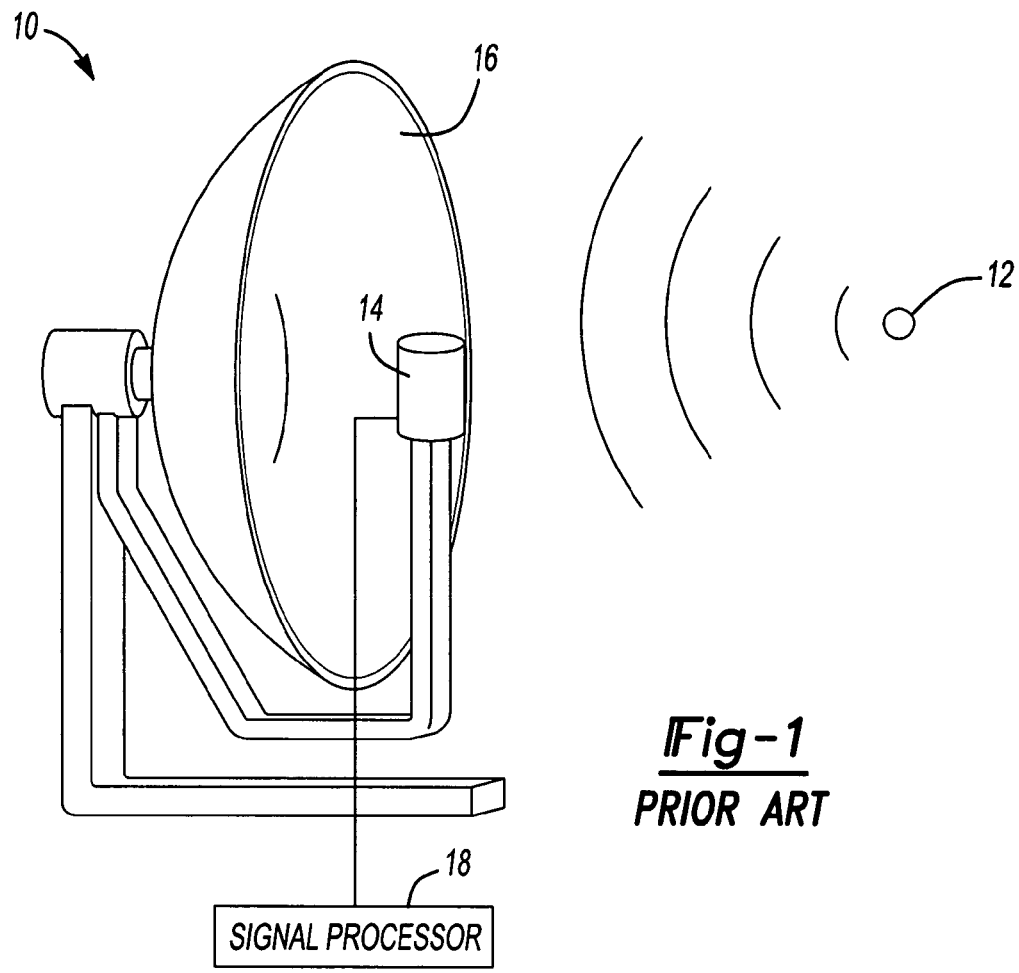
FIG. 1 illustrates a parabolic sound reflector according to the prior art.

A conventional method of noise source detection uses sound reflection to determine noise sources. The sound reflection method uses a sound reflector in the shape of a concave paraboloid. The sound reflector forms an image of sound pressure distribution of a sound field on a microphone array. The microphone array is disposed on an image plane of the sound reflector. An exemplary sound reflector 10 is shown in FIG. 1. The sound reflector 10 receives sound waves from a noise source 12. A microphone or microphone array 14 receives sound waves directly from the noise source 12 in addition to reflected sound waves from all elements of a reflective surface 16. The microphone array 14 communicates the sound wave information to a signal processor system 18.

The signal processor system 18 determines a sound image based on the intensity of the sound pressure at a particular image point. The signal processor system 18 uses various components of the sound wave information to determine the sound intensity, such as a sum of the sound intensity from the direct sound waves and the sound intensity from the reflected sound waves. The signal processor system 18 uses this acquired data in conjunction with known data such as the distance from the noise source 12 to the sound reflector 10 or the microphone array 14, the wavelength of the sound waves, and the angle of incidence of the sound wave to the sound reflector 10.

Figure 2:
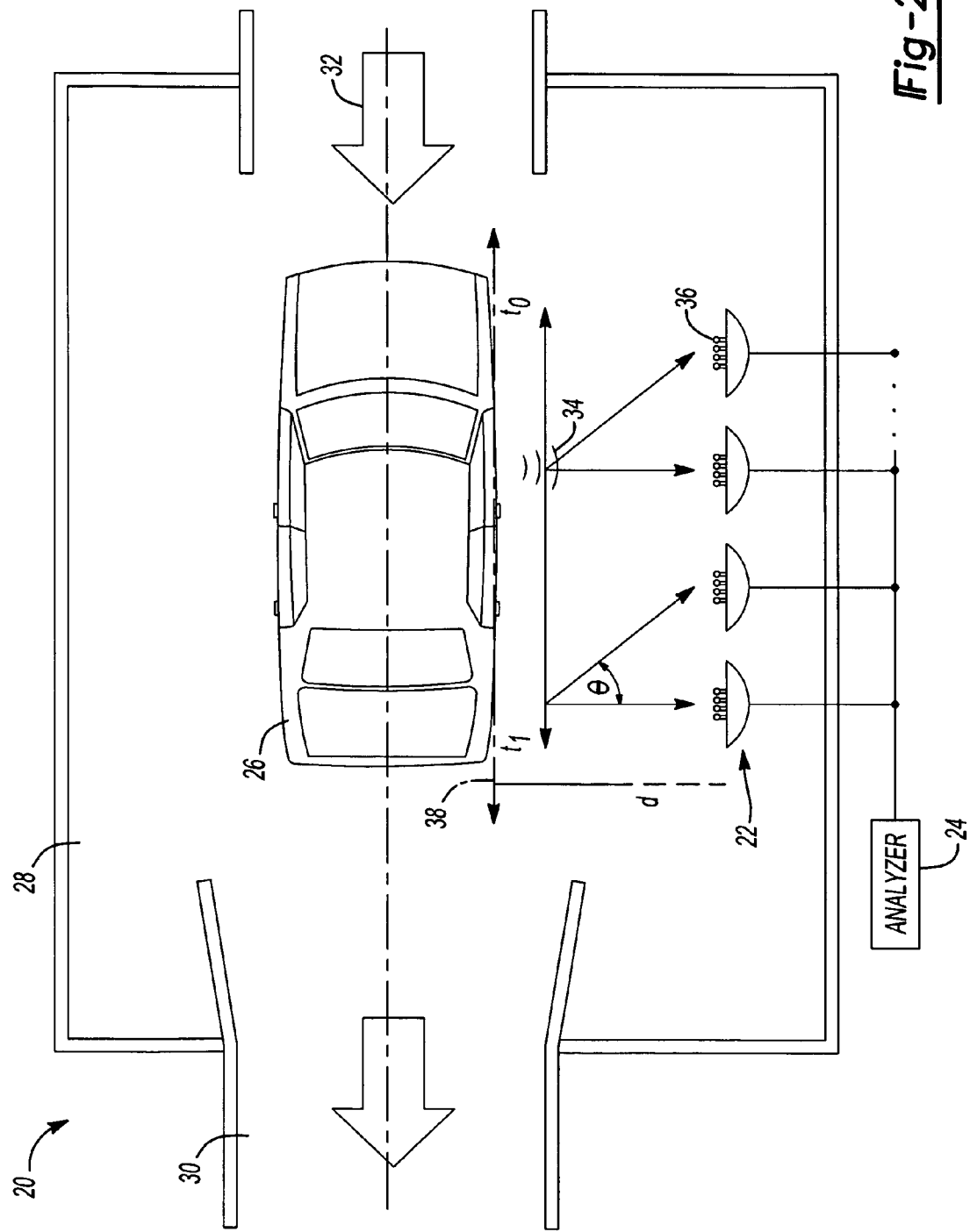
FIG. 2 illustrates an aerodynamic noise source measurement system incorporating a sound reflector array according to the present invention.

With reference to FIG. 2, an automotive noise source measurement system 20 according to the present invention includes a sound reflector array 22, a signal processor 24, and a vehicle 26. The vehicle 26 is positioned within a test section 28 of a wind tunnel 30 such that the vehicle 26 is within the air flow of the wind tunnel 30. The air flow of the wind tunnel 30 is demonstrated by arrow 32. The sound reflector array 22 is positioned within the test section 28 such that the sound reflector array 22 is not within the air flow of the wind tunnel 30. In this manner, the air flow of the wind tunnel 30 has a negligible effect on the sound waves received by the sound reflector array 22.

A measurement grid is defined on the surface of the vehicle 26 to mark target points for measurements. For example, a laser pointing device may be used to accurately position elements of the sound reflector array 22. The air flow interacts with the vehicle 26 to generate sound waves 34. Acoustic surface pressure fields of the vehicle 26 that are exposed to the airflow cause the sound waves 34. Each sound reflector in the sound reflector array 22 includes a microphone array 36. The microphone array 36 receives the sound waves 34 that the vehicle 26 generates. Each microphone array 36 receives sound waves according to its target position as defined by the measurement grid. Additionally, each sound reflector in the sound reflector array 22 reflects the sound waves 34 and amplifies sound pressure levels at the microphone array 36. The microphone array 36 is located on the image plane of the reflector, which allows real-time measurements and position detection of the sound waves 34 from multiple locations on the vehicle.

The use of multiple sound reflectors allows the signal processor 24 to measure sound wave propagation and analyze sound data from all target points of the vehicle simultaneously. The signal processor 24 processes the signals in real-time by performing time sampling at each measurement point. The signal processor may analyze and output the results in real-time, and/or record the signals for subsequent analysis. In the preferred embodiment, the signal processor performs time sampling according to calculations based on a combination of the Helmholz integral equation, the cross spectra, and the time delay of arriving signals. For example, the Helmholz integral equation relates pressure and the normal component of particle velocity over a closed surface to the pressure at some point outside the surface according to $$p(r) = \int_S \left\{ u_n G(\underline{r}, \underline{r}') - p \frac{\partial}{\partial n} G(\underline{r}, \underline{r}') \right\} dS(\underline{r}'),$$

where $u_n$ is the normal component of particle velocity, p is pressure, $G(\underline{r},\underline{r}')$ is Green's function, S is the surface enclosing the source, and $dS(\underline{r}')$ is the surface area element at r'. Further, the cross spectra is a measurement of the cross spectrum from each point on the measurement grid of the vehicle to every other point. The determination of the Helmholz equation is based partially on the cross spectra.

The signal processor 24 processes data obtained from the signals to determine an acoustic image that is indicative of the aerodynamic noise properties, of the vehicle 26. For example, the signal processor 24 analyzes the data while taking into account propagation times for the aerodynamic noise 34 to reach each microphone array 36 from a particular noise source on the vehicle 26. The signal processor 24 takes other factors into account, including but not limited to: a distance d between a noise source, or a measurement plane 38, and a focal point of each sound reflector; a directional angle θ; and a wavelength of the aerodynamic noise 34.

Figure 3:
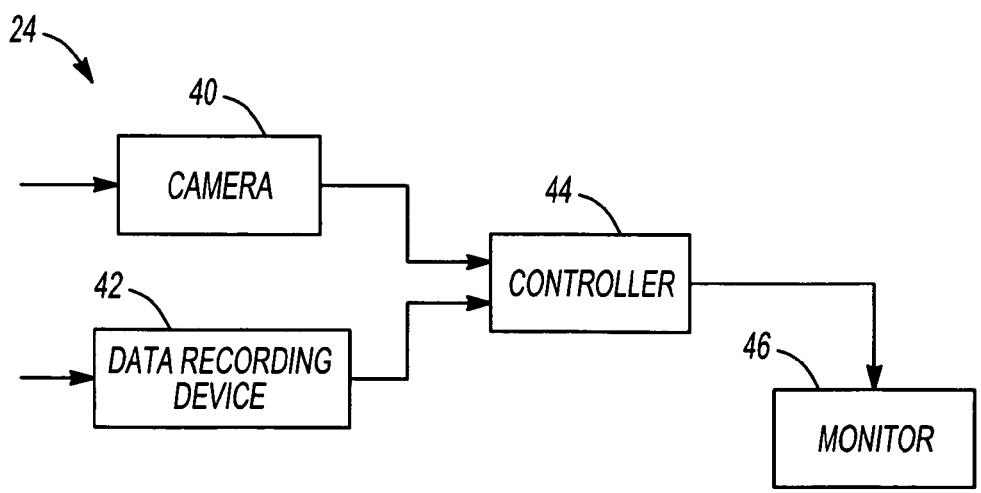
FIG. 3 is a functional block diagram of a signal processor according to the present invention.

The signal processor 24 includes a digital camera 40 or other image-capturing device, a data recording device 42, and a controller 44 as shown in FIG. 3. The digital camera 40 acquires an image of the surface of the vehicle. Each microphone in the microphone array acquires a time function of the sound waves generated by the vehicle according to the specific location of each microphone. The data-recording device 42 records signals received from the microphones. The controller 44 receives visual data from the digital camera 40 and the audio data from the data-recording device 42. Alternatively, the controller 44 receives the audio data directly from the microphones for real-time processing. The controller 44 calculates a sound map or acoustic image in real-time based on the audio and/or visual data as it is received from the microphones. More specifically, the controller 44 uses a Fourier transform equation to calculate a spectrum of the sound pressure level at each location on the surface of the vehicle as defined by the measurement grid. In the preferred embodiment, the controller 44 allows selection of a specific frequency range and superimposes the sound pressure levels onto the visual data to identify precise locations of noise sources on the vehicle. In this manner, a user may view the image of the vehicle with an overlay of corresponding audio data of the vehicle, such as sound pressure levels, in real-time. For example, the controller 44 may communicate with a monitor 46. The controller 44 transmits the image of the vehicle with the audio data overlay to the monitor 46. In another embodiment, the digital camera 40 communicates the image of the vehicle directly to the monitor 46.

Figure 4:
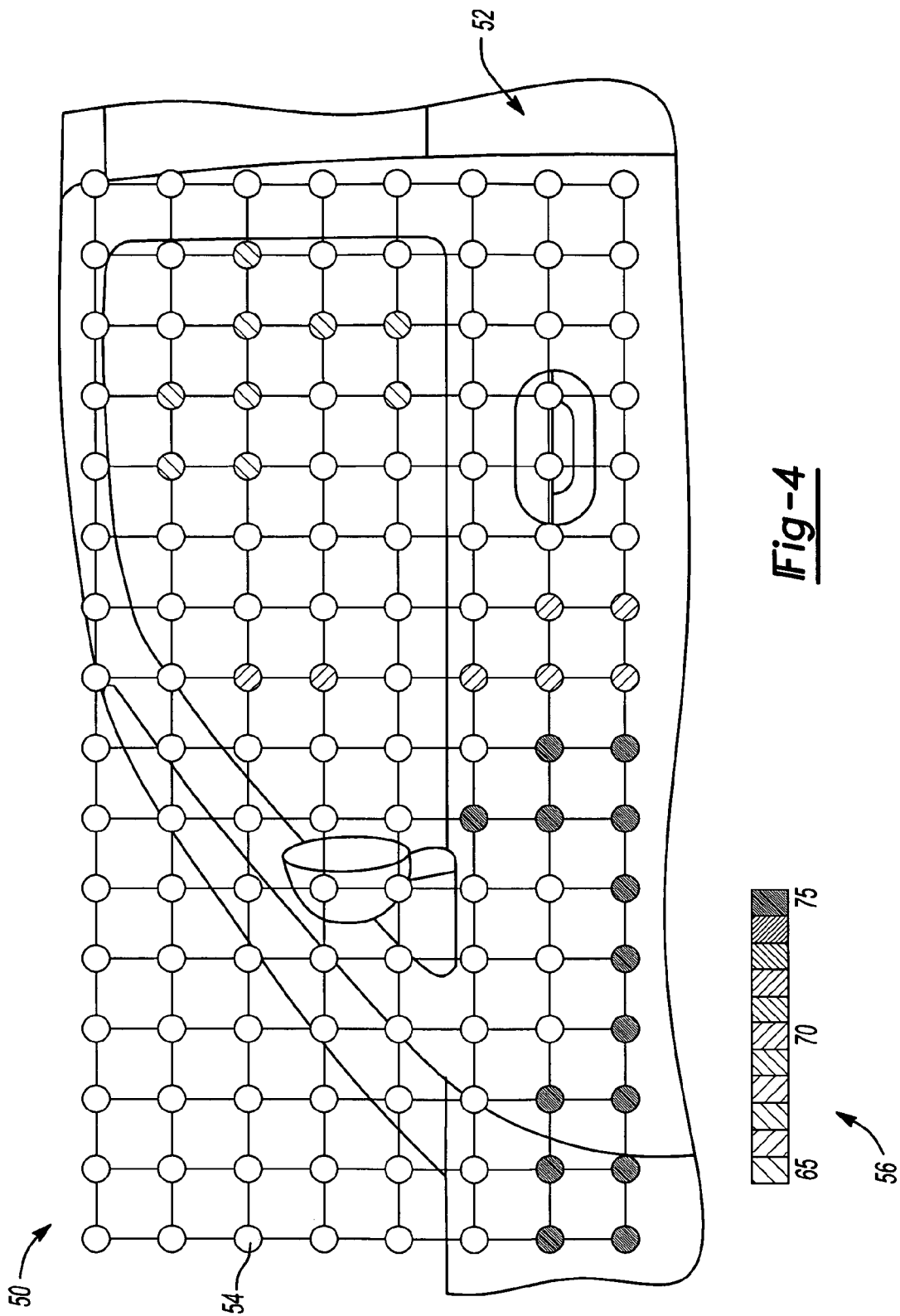
FIG. 4 is an illustration of a vehicle image with an audio data overlay according to the present invention.

A vehicle image 50 includes an audio data overlay 52 as shown in FIG. 4. The vehicle image 50 is displayed on the monitor 46 (as shown in FIG. 3. The audio data overlay 52 includes a plurality of location nodes 54. The location nodes 54 indicate a relative sound level. For example, in the preferred embodiment, the location nodes 54 indicate sound level in decibels based on color. A key 56 indicates the decibel level for each location node 54 according to the color of a particular node.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An aerodynamic noise measurement system for a vehicle comprising:
a wind tunnel that generates a flow of air;
a test area within the flow of air;
a plurality of sound reflectors positioned along one side of the vehicle and arranged outside of the flow of air, wherein each of the sound reflectors is arranged to receive sound waves from a specific portion of the vehicle simultaneously in real-time and includes a microphone array that measures_aerodynamic noise generated by a vehicle in the test area and generates data signals indicative of the measured aerodynamic noise; and
an analyzer system that receives the data signals and generates an image of the vehicle and a noise map overlay with precise position of noise sources based on the data signals.

2. The aerodynamic noise measurement system of claim 1 wherein the analyzer system determines a time function of the aerodynamic noise according to the data signals.

3. The aerodynamic noise measurement system of claim 1 wherein the analyzer system performs time sampling on the data signals.

4. The aerodynamic noise measurement system of claim 3 wherein the analyzer system performs the time sampling based on at least one of a Helmholz integral equation, a cross spectra, and a time delay of the aerodynamic noise from the specific portion of the vehicle.

5. The aerodynamic noise measurement system of claim 1 wherein the analyzer system calculates a spectrum of a sound pressure level at the specific portions of the vehicle.

6. The aerodynamic noise measurement system of claim 5 wherein the analyzer system calculates the spectrum according to a Fourier transform equation.

7. The aerodynamic noise measurement system of claim 1 further comprising a viewing device that displays an image of the vehicle with an overlay of audio data that is indicative of the aerodynamic noise from the specific portions of the vehicle.

8. The aerodynamic noise measurement system of claim 7 wherein the overlay includes sound pressure levels of the aerodynamic noise from the specific portions of the vehicle.

9. The aerodynamic noise measurement system of claim 7 wherein the viewing device displays the image and the overlay in real-time.

10. An aerodynamic noise measurement method comprising:

generating a flow of air;

locating a vehicle within the flow of air;

measuring aerodynamic noise from the vehicle at a plurality of sound reflectors positioned along one side of the vehicle and arranged outside the flow of air;

measuring aerodynamic noise from a first portion of the vehicle at a first one of the plurality of sound reflectors and simultaneously in real-time measuring aerodynamic noise from a second portion of the vehicle at a second one of the plurality of sound reflectors;

generating data signals indicative of the measured aerodynamic noise;

generating an image of the vehicle and a noise map overlay with precise position of noise sources based on the data signals.

11. The aerodynamic noise measurement method of claim 10 further comprising determining a time function of the aerodynamic noise according to the data signals.

12. The aerodynamic noise measurement method of claim 10 further comprising performing time sampling on the data signals.

13. The aerodynamic noise measurement method of claim 12 wherein the step of performing time sampling includes performing time sampling based on at least one of a Helmholz integral equation, a cross spectra, and a time delay of the aerodynamic noise from the specific portion of the vehicle.

14. The aerodynamic noise measurement method of claim 10 further comprising calculating a spectrum of a sound pressure level at the first portion and the second portion.

15. The aerodynamic noise measurement method of claim 14 wherein the step of calculating includes calculating the spectrum according to a Fourier transform equation.

16. The aerodynamic noise measurement method of claim 10 further comprising displaying an image of the vehicle with an overlay of audio data indicative of the aerodynamic noise.

17. The aerodynamic noise measurement method of claim 16 wherein the step of measuring the aerodynamic noise and the step of displaying the overlay of audio data indicative of the aerodynamic noise occur simultaneously.

18. The aerodynamic noise measurement method of claim 17 wherein the step of displaying includes displaying sound pressure levels at the first and second portions.

* * * * *